US012039939B2

(12) United States Patent
In et al.

(10) Patent No.: US 12,039,939 B2
(45) **Date of Patent: *Jul. 16, 2024**

(54) EMISSION DRIVER, DISPLAY APPARATUS INCLUDING THE SAME AND METHOD OF DRIVING DISPLAY APPARATUS

(71) Applicant: Samsung Display Co., Ltd., Yongin-si (KR)

(72) Inventors: Hai-Jung In, Seoul (KR); Kimyeong Eom, Suwon-si (KR); Ji-Hyun Ka, Seongnam-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,197

(22) Filed: Feb. 17, 2023

(65) Prior Publication Data

US 2023/0197016 A1 Jun. 22, 2023

Related U.S. Application Data

(63) Continuation of application No. 17/321,825, filed on May 17, 2021, now Pat. No. 11,587,513.

(30) Foreign Application Priority Data

May 22, 2020 (KR) ........................ 10-2020-0061893

(51) Int. Cl.
*G09G 3/3291* (2016.01)

(52) U.S. Cl.
CPC ....... *G09G 3/3291* (2013.01); *G09G 2310/08* (2013.01); *G09G 2330/04* (2013.01)

(58) Field of Classification Search
CPC ............. G09G 3/3291; G09G 2310/08; G09G 2330/04
See application file for complete search history.

(56) References Cited

U.S. PATENT DOCUMENTS 10,453,386 B2 10/2019 Jang
11,587,513 B2 * 2/2023 In ........................ G09G 3/3291
(Continued)

FOREIGN PATENT DOCUMENTS

KR 100969784 B1 7/2010
KR 101881853 B1 7/2018
KR 101944465 B1 2/2019

OTHER PUBLICATIONS

Extended European Search Report for Application No. 21175429.6-1209 dated Sep. 16, 2021.

*Primary Examiner* — Kenneth B Lee, Jr.

(74) *Attorney, Agent, or Firm* — CANTOR COLBURN LLP

(57) ABSTRACT

An emission driver includes a plurality of stages. A stage of the plurality of stages receives a start signal, a first clock signal, a second clock signal, a protection signal, a first gate power voltage and a second gate power voltage and outputs an emission signal. The stage of the plurality of stages includes a pull-up switching element connected between a first gate power voltage terminal which receives the first gate power voltage and an emission signal output terminal which outputs the emission signal, a pull-down switching element connected between a second gate power voltage terminal which receives the second gate power voltage and the emission signal output terminal and a protection switching element which applies the first gate power voltage to a control electrode of the pull-down switching element in response to the protection signal.

14 Claims, 14 Drawing Sheets

(56) References Cited

U.S. PATENT DOCUMENTS

| | | | | |
|---|---|---|---|---|
| 2009/0225068 | A1 | 9/2009 | Jeong et al. | |
| 2012/0176417 | A1* | 7/2012 | Jang | G11C 19/184<br>345/77 |
| 2012/0188290 | A1 | 7/2012 | Park et al. | |
| 2016/0155409 | A1 | 6/2016 | Jeoung et al. | |
| 2016/0294180 | A1 | 10/2016 | Pagano et al. | |
| 2019/0287458 | A1* | 9/2019 | Park | G09G 3/3233 |
| 2019/0318690 | A1 | 10/2019 | Lee et al. | |

* cited by examiner

EMISSION DRIVER, DISPLAY APPARATUS INCLUDING THE SAME AND METHOD OF DRIVING DISPLAY APPARATUS

This application is a continuation of U.S. patent application Ser. No. 17/321,825, filed on May 17, 2021, which claims priority to Korean Patent Application No. 10-2020-0061893, filed on May 22, 2020, and all the benefits accruing therefrom under 35 U.S.C. § 119, the content of which in its entirety is herein incorporated by reference.

BACKGROUND

1. Field

Embodiments of the invention relate to an emission driver, a display apparatus including the emission driver and a method of driving the display apparatus. More particularly, embodiments of the invention relate to an emission driver including a stage including a flashing preventing switching element for preventing an image flashing occurred at an initial driving period and an abnormal off situation, a display apparatus including the emission driver and a method of driving the display apparatus.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals respectively to the plurality of gate lines. The data driver outputs data voltages respectively to the plurality of data lines. The emission driver outputs emission signals respectively to the plurality of emission lines. The driving controller controls the gate driver, the data driver and the emission driver.

SUMMARY

At an initial driving period of a display apparatus or an abnormal off situation of the display apparatus, an unintended emission signal may be applied to a display panel so that the display panel may unintentionally flash.

Embodiments of the invention provide an emission driver capable of enhancing a display quality of a display panel by preventing an image flashing occurred at an initial driving period and an abnormal off situation.

Embodiments of the invention also provide a display apparatus including the emission driver.

Embodiments of the invention also provide a method of driving the display apparatus.

In an embodiment of an emission driver according to the invention, the emission driver includes a plurality of stages. At least one of the plurality of stages receives a start signal, a first clock signal, a second clock signal, a protection signal, a first gate power voltage and a second gate power voltage and outputs an emission signal. The at least one of the plurality of stages include a pull-up switching element connected between a first gate power voltage terminal which receives the first gate power voltage and an emission signal output terminal which outputs the emission signal, a pull-down switching element connected between a second gate power voltage terminal which receives the second gate power voltage and the emission signal output terminal and a protection switching element which applies the first gate power voltage to a control electrode of the pull-down switching element in response to the protection signal.

In an embodiment, the at least one of the plurality of stages may further include a first switching element which applies the start signal to a fourth node in response to the first clock signal, a second switching element which applies the first gate power voltage to a second node in response to a voltage of a first node, a third switching element which applies the second clock signal to the second node in response to a voltage of a third node and a twelfth switching element which applies a voltage of the fourth node to an eighth node in response to the second gate power voltage.

In an embodiment, the at least one of the plurality of stages may further include a fourth switching element which applies the first clock signal to the first node in response to the voltage of the fourth node, a fifth switching element which applies the second gate power voltage to the first node in response to the first clock signal, a sixth switching element which connects a fifth node to a seventh node in response to the second clock signal, a seventh switching element which applies the second clock signal to the fifth node in response to a voltage of a sixth node, an eighth switching element which applies the first gate power voltage to the seventh node in response to the voltage of the fourth node and an eleventh switching element which connects the first node to the sixth node in response to the second gate power voltage.

In an embodiment, the at least one of the plurality of stages may further include a first capacitor including a first electrode connected to the first gate power voltage terminal and a second electrode connected to the seventh node.

In an embodiment, the at least one of the plurality of stages may further include a second capacitor including a first electrode connected to the fifth node and a second electrode connected to the sixth node.

In an embodiment, the at least one of the plurality of stages may further include a third capacitor including a first electrode connected to the second node and a second electrode connected to the third node.

In an embodiment, the protection switching element may be connected to the fourth node.

In an embodiment, the protection switching element may be connected to the eighth node.

In an embodiment, the protection signal may turn on the protection switching element in an initial driving period and turn off the protection switching element in a normal driving period after the initial driving period.

In an embodiment, in the initial driving period, the start signal has the first gate power voltage, the first clock signal has the second gate power voltage, the second clock signal has the second gate power voltage and the protection signal has the second gate power voltage.

In an embodiment, a capacitance of a line applying the first gate power voltage may be greater than a capacitance of a line applying the protection signal.

In an embodiment of a display apparatus according to the invention, the display apparatus includes a display panel, a gate driver, a data driver and an emission driver. The display panel displays an image. The gate driver provides a gate signal to the display panel. The data driver provides a data voltage to the display panel. The emission driver provides an emission signal to the display panel. The emission driver includes a plurality of stages. At least one of the plurality of stages receives a start signal, a first clock signal, a second clock signal, a protection signal, a first gate power voltage and a second gate power voltage and outputs the emission signal. The at least one of the plurality of stages may include a pull-up switching element connected between a first gate power voltage terminal which receives the first gate power voltage and an emission signal output terminal which outputs the emission signal, a pull-down switching element connected between a second gate power voltage terminal which receives the second gate power voltage and the emission signal output terminal and a protection switching element which applies the first gate power voltage to a control electrode of the pull-down switching element in response to the protection signal.

In an embodiment, the at least one of the plurality of stages may further include a first switching element which applies the start signal to a fourth node in response to the first clock signal, a second switching element which applies the first gate power voltage to a second node in response to a voltage of a first node, a third switching element which applies the second clock signal to the second node in response to a voltage of a third node and a twelfth switching element which applies a voltage of the fourth node to an eighth node in response to the second gate power voltage.

In an embodiment, the at least one of the plurality of stages may further include a fourth switching element which applies the first clock signal to the first node in response to the voltage of the fourth node, a fifth switching element which applies the second gate power voltage to the first node in response to the first clock signal, a sixth switching element which connects a fifth node to a seventh node in response to the second clock signal, a seventh switching element which applies the second clock signal to the fifth node in response to a voltage of a sixth node, an eighth switching element which applies the first gate power voltage to the seventh node in response to the voltage of the fourth node and an eleventh switching element which connects the first node to the sixth node in response to the second gate power voltage.

In an embodiment, the at least one of the plurality of stages may further include a first capacitor including a first electrode connected to the first gate power voltage terminal and a second electrode connected to the seventh node, a second capacitor including a first electrode connected to the fifth node and a second electrode connected to the sixth node and a third capacitor including a first electrode connected to the second node and a second electrode connected to the third node.

In an embodiment, the display panel may include a plurality of pixels. Each of the plurality of pixels may include an organic light emitting element. A pixel of the plurality of pixels may receive a data write gate signal, a data initialization gate signal, an organic light emitting element initialization gate signal, the data voltage and the emission signal and emit the organic light emitting element according to a level of the data voltage to display the image.

In an embodiment, at least one of the plurality of pixels may include a first pixel switching element including a control electrode connected to a first pixel node, an input electrode connected to a second pixel node and an output electrode connected to a third pixel node, a second pixel switching element including a control electrode to which the data write gate signal is applied, an input electrode to which the data voltage is applied and an output electrode connected to the second pixel node, a third pixel switching element including a control electrode to which the data write gate signal is applied, an input electrode connected to the first pixel node and an output electrode connected to the third pixel node, a fourth pixel switching element including a control electrode to which the data initialization gate signal is applied, an input electrode to which an initialization voltage is applied and an output electrode connected to the first pixel node, a fifth pixel switching element including a control electrode to which the emission signal is applied, an input electrode to which a high power voltage is applied and an output electrode connected to the second pixel node, a sixth pixel switching element including a control electrode to which the emission signal is applied, an input electrode connected to the third pixel node and an output electrode connected to an anode electrode of the organic light emitting element, a seventh pixel switching element including a control electrode to which the organic light emitting element initialization gate signal is applied, an input electrode to which the initialization voltage is applied and an output electrode connected to the anode electrode of the organic light emitting element, a storage capacitor including a first electrode to which the high power voltage is applied and a second electrode connected to the first pixel node and the organic light emitting element including the anode electrode and a cathode electrode to which a low power voltage is applied.

In an embodiment of a method of driving a display apparatus, the method includes providing a gate signal to a display panel using a gate driver, providing a data voltage to the display panel using a data driver and providing an emission signal to the display panel using an emission driver. The emission driver includes a plurality of stages. At least one of the plurality of stages receives a start signal, a first clock signal, a second clock signal, a protection signal, a first gate power voltage and a second gate power voltage and outputs the emission signal. The at least one of the plurality of stages includes a pull-up switching element connected between a first gate power voltage terminal which receives the first gate power voltage and an emission signal output terminal which outputs the emission signal, a pull-down switching element connected between a second gate power voltage terminal which receives the second gate power voltage and the emission signal output terminal and a protection switching element which applies the first gate power voltage to a control electrode of the pull-down switching element in response to the protection signal.

In an embodiment, the protection signal may turn on the protection switching element in an initial driving period and turn off the protection switching element in a normal driving period after the initial driving period.

In an embodiment, a capacitance of a line applying the first gate power voltage may be greater than a capacitance of a line applying the protection signal. When the display apparatus is abnormally turned off, the protection signal applied to the control electrode of the protection switching element may decrease faster than the first gate power voltage applied to the input electrode of the protection switching element so that the protection switching element may be turned on and the pull-down switching element may be turned off According to the emission driver, the display apparatus and the method of driving the display apparatus, the stage of the emission driver includes a flashing preventing switching element so that the image flashing occurred at the initial driving period and the abnormal off situation may be prevented. Thus, the display quality of the display panel may be enhanced.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
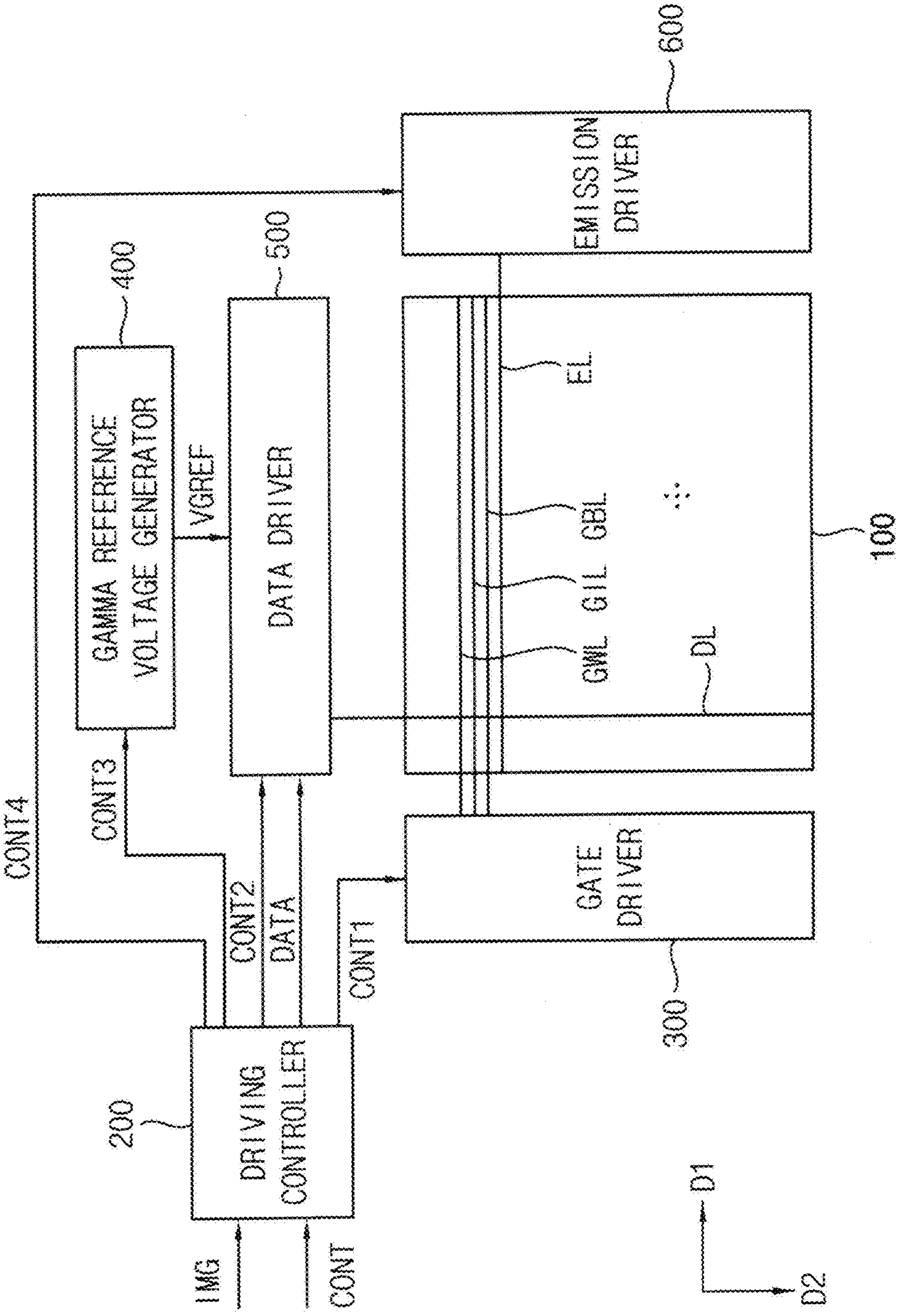
FIG. 1 is a block diagram illustrating an embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating an embodiment of a display apparatus according to the invention.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

The display panel 100 includes a display region on which an image is displayed and a peripheral region adjacent to the display region.

The display panel 100 includes a plurality of gate lines GWL, GIL and GBL, a plurality of data lines DL, a plurality of emission lines EL and a plurality of pixels electrically connected to the gate lines GWL, GIL and GBL, the data lines DL and the emission lines EL. The gate lines GWL, GIL and GBL extend in a first direction D1, the data lines DL extend in a second direction D2 crossing the first direction D1 and the emission lines EL extend in the first direction D1.

The driving controller 200 receives input image data IMG and an input control signal CONT from an external apparatus (not shown). In an embodiment, the input image data IMG may include red image data, green image data and blue image data, for example. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL, GIL and GBL in response to the first control signal CONT1 received from the driving controller 200. The gate driver 300 may sequentially output the gate signals to the gate lines GWL, GIL and GBL.

In an embodiment, the gate driver 300 may be integrated on the peripheral region of the display panel 100, for example. In an embodiment, the gate driver 300 may be disposed (e.g., mounted) on the peripheral region of the display panel 100, for example.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL. In an embodiment, the emission driver 600 may be integrated on the peripheral region of the display panel 100, for example. In an embodiment, the emission driver 600 may be disposed (e.g., mounted) on the peripheral region of the display panel 100, for example. Although the gate driver 300 is disposed on a first side (e.g., left side) of the display panel 100 and the emission driver 600 is disposed on a second side (e.g., right side) of the display panel 100 opposite to the first side of the display panel 100 in FIG. 1, the invention may not be limited thereto. In an alternative embodiment, both the gate driver 300 and the emission driver 600 may be disposed on the same side with respect to the display panel 100. In an embodiment, both the gate driver 300 and the emission driver 600 may be integrated on the peripheral region on the same side with respect to the display region of the display panel 100, for example.

Figure 2:
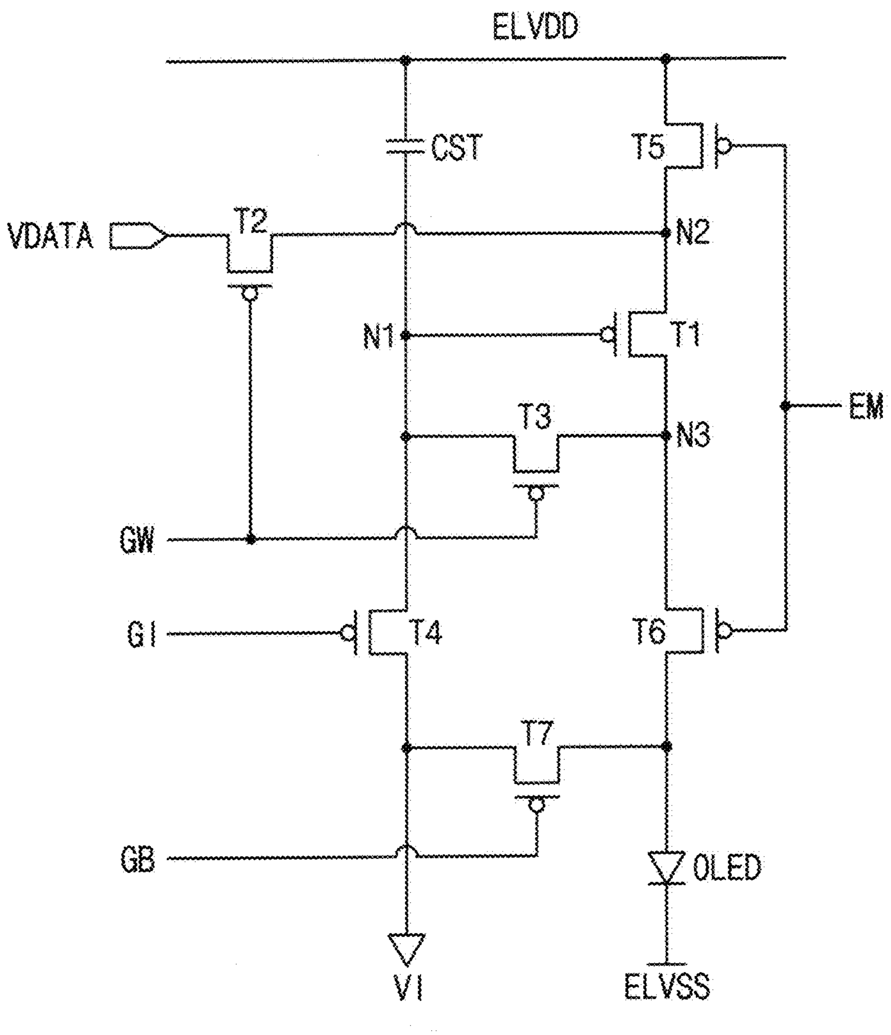
FIG. 2 is a circuit diagram illustrating a pixel of a display panel of FIG. 1.
Figure 3:
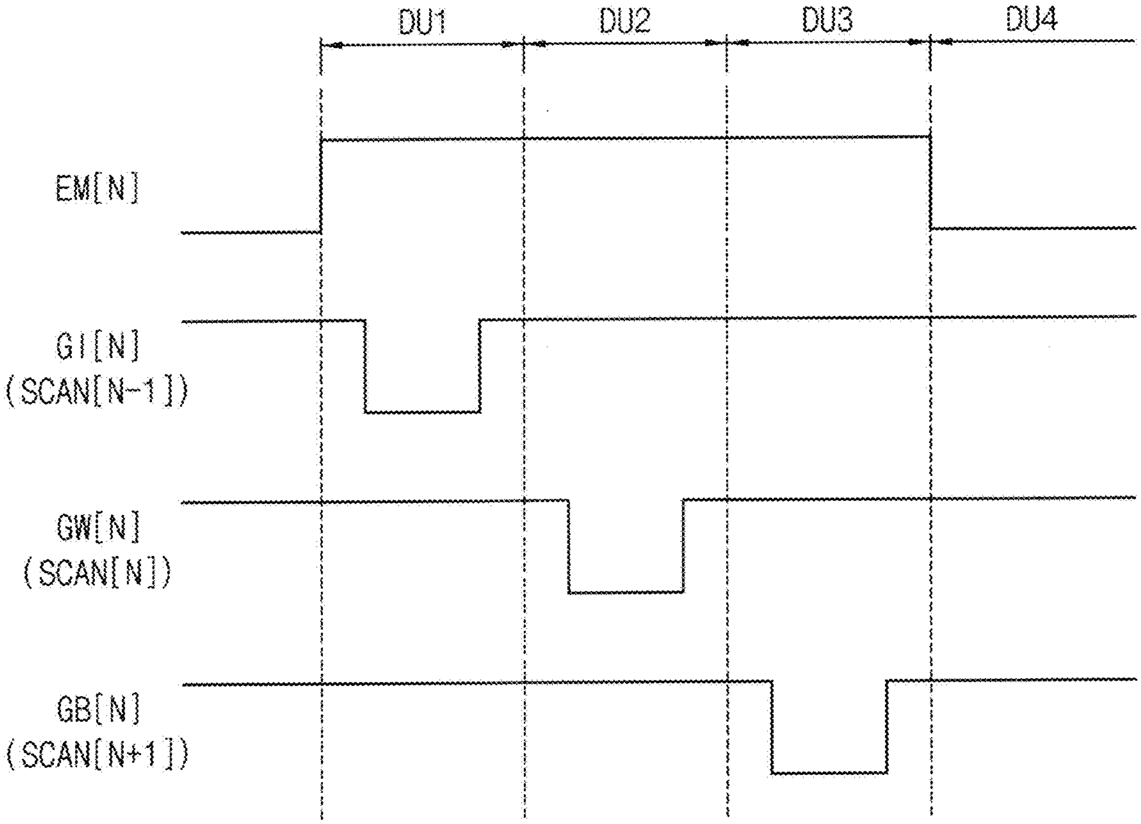
FIG. 3 is a timing diagram illustrating input signals applied to the pixel of FIG. 2.

FIG. 2 is a circuit diagram illustrating a pixel of the display panel 100 of FIG. 1. FIG. 3 is a timing diagram illustrating input signals applied to the pixel of FIG. 2.

Referring to FIGS. 1 to 3, the display panel 100 includes the plurality of the pixels. Each pixel includes an organic light emitting element OLED. In an embodiment, the organic light emitting element OLED may be an organic light emitting diode OLED, for example.

The pixels receive a data write gate signal GW, a data initialization gate signal GI, an organic light emitting element initialization gate signal GB, the data voltage VDATA and the emission signal EM and the organic light emitting elements OLED of the pixels emit light corresponding to the level of the data voltage VDATA to display the image.

At least one of the pixels may include first to seventh pixel switching elements T1 to T7, a storage capacitor CST and the organic light emitting element OLED.

The first pixel switching element T1 includes a control electrode connected to a first pixel node N1, an input electrode connected to a second pixel node N2 and an output electrode connected to a third pixel node N3.

In an embodiment, the first pixel switching element T1 may be a p-type thin film transistor ("TFT"), for example. The control electrode of the first pixel switching element T1 may be a gate electrode, the input electrode of the first pixel switching element T1 may be a source electrode and the output electrode of the first pixel switching element T1 may be a drain electrode.

The second pixel switching element T2 includes a control electrode to which the data write gate signal GW is applied, an input electrode to which the data voltage VDATA is applied and an output electrode connected to the second pixel node N2.

In an embodiment, the second pixel switching element T2 may be a p-type TFT, for example. The control electrode of the second pixel switching element T2 may be a gate electrode, the input electrode of the second pixel switching element T2 may be a source electrode and the output electrode of the second pixel switching element T2 may be a drain electrode.

The third pixel switching element T3 includes a control electrode to which the data write gate signal GW is applied, an input electrode connected to the first pixel node N1 and an output electrode connected to the third pixel node N3.

In an embodiment, the third pixel switching element T3 may be a p-type TFT, for example. The control electrode of the third pixel switching element T3 may be a gate electrode, the input electrode of the third pixel switching element T3 may be a source electrode and the output electrode of the third pixel switching element T3 may be a drain electrode.

The fourth pixel switching element T4 includes a control electrode to which the data initialization gate signal GI is applied, an input electrode to which an initialization voltage VI is applied and an output electrode connected to the first pixel node N1.

In an embodiment, the fourth pixel switching element T4 may be a p-type TFT, for example. The control electrode of the fourth pixel switching element T4 may be a gate electrode, the input electrode of the fourth pixel switching element T4 may be a source electrode and the output electrode of the fourth pixel switching element T4 may be a drain electrode.

The fifth pixel switching element T5 includes a control electrode to which the emission signal EM is applied, an input electrode to which a high power voltage ELVDD is applied and an output electrode connected to the second pixel node N2.

In an embodiment, the fifth pixel switching element T5 may be a p-type TFT, for example. The control electrode of the fifth pixel switching element T5 may be a gate electrode, the input electrode of the fifth pixel switching element T5 may be a source electrode and the output electrode of the fifth pixel switching element T5 may be a drain electrode.

The sixth pixel switching element T6 includes a control electrode to which the emission signal EM is applied, an input electrode connected to the third pixel node N3 and an output electrode connected to an anode electrode of the organic light emitting element OLED.

In an embodiment, the sixth pixel switching element T6 may be a p-type TFT, for example. The control electrode of the sixth pixel switching element T6 may be a gate electrode, the input electrode of the sixth pixel switching element T6 may be a source electrode and the output electrode of the sixth pixel switching element T6 may be a drain electrode.

The seventh pixel switching element T7 includes a control electrode to which the organic light emitting element initialization gate signal GB is applied, an input electrode to which the initialization voltage VI is applied and an output electrode connected to the anode electrode of the organic light emitting element OLED.

In an embodiment, the seventh pixel switching element T7 may be a p-type TFT, for example. The control electrode of the seventh pixel switching element T7 may be a gate electrode, the input electrode of the seventh pixel switching element T7 may be a source electrode and the output electrode of the seventh pixel switching element T7 may be a drain electrode.

The storage capacitor CST includes a first electrode to which the high power voltage ELVDD is applied and a second electrode connected to the first pixel node N1.

The organic light emitting element OLED includes the anode electrode and a cathode electrode. A low power voltage ELVSS may be applied to the cathode electrode.

In FIG. 3, during a first duration DU1, the first pixel node N1 and the storage capacitor CST are initialized in response to the data initialization gate signal GI. During a second duration DU2, a threshold voltage |VTH| of the first pixel switching element T1 is compensated and the data voltage VDATA of which the threshold voltage |VTH| is compensated is written to the first pixel node N1 in response to the data write gate signal GW. During a third duration DU3, the anode electrode of the organic light emitting element OLED is initialized in response to the organic light emitting element initialization gate signal GB. During a fourth duration DU4, the organic light emitting element OLED emit the light in response to the emission signal EM so that the display panel 100 displays the image.

During the first duration DU1, the data initialization gate signal GI may have an active level. In an embodiment, the active level of the data initialization gate signal GI may be a low level, for example. When the data initialization gate signal GI has the active level, the fourth pixel switching element T4 is turned on so that the initialization voltage (hereinafter, also referred to as "initialization signal") VI may be applied to the first pixel node N1. The data initialization gate signal GI[N] of a current stage may be a scan signal SCAN[N−1] of a previous stage.

During the second duration DU2, the data write gate signal GW may have an active level. In an embodiment, the active level of the data write gate signal GW may be a low level, for example. When the data write gate signal GW has the active level, the second pixel switching element T2 and the third pixel switching element T3 are turned on. In addition, the first pixel switching element T1 is turned on in response to the initialization signal VI. The data write gate signal GW[N] of the current stage may be a scan signal SCAN[N] of the current stage.

A voltage which is subtraction of the threshold voltage |VTH| of the first pixel switching element T1 from the data voltage VDATA may be charged at the first pixel node N1 along a path generated by the first to third pixel switching elements T1, T2 and T3.

During the third duration DU3, the organic light emitting element initialization gate signal GB may have an active level. In an embodiment, the active level of the organic light emitting element initialization gate signal GB may be a low level, for example. When the organic light emitting element initialization gate signal GB has the active level, the seventh pixel switching element T7 is turned on so that the initialization signal VI may be applied to the anode electrode of the organic light emitting element OLED. The organic light emitting element initialization gate signal GB[N] of the current stage may be a scan signal SCAN[N+1] of a next stage.

Although the active duration of the organic light emitting element initialization gate signal GB may be different from the active duration of the data write gate signal GW in the illustrated embodiment, the active duration of the organic light emitting element initialization gate signal GB may be same as the active duration of the data write gate signal GW. In an embodiment, the organic light emitting element initialization gate signal GB of the current stage may be a scan signal SCAN[N] of the current stage, for example. In this case, the control electrode of the seventh pixel switching element T7 may be connected to the control electrode of the second pixel switching element T2.

During the fourth duration DU4, the emission signal EM (e.g., EM[N]) may have an active level. The active level of the emission signal EM may be a low level. When the emission signal EM has the active level, the fifth pixel switching element T5 and the sixth pixel switching element T6 are turned on. In addition, the first pixel switching element T1 is turned on by the data voltage VDATA.

A driving current flows through the fifth pixel switching element T5, the first pixel switching element T1 and the sixth pixel switching element T6 to drive the organic light emitting element OLED. An intensity of the driving current may be determined by the level of the data voltage VDATA. A luminance of the organic light emitting element OLED is determined by the intensity of the driving current. The driving current ISD flowing through a path from the input electrode to the output electrode of the first pixel switching element T1 is determined as following Equation 1.

$$ISD = \frac{1}{2}\mu Cox\frac{W}{L}(VSG - |VTH|)^2 \quad \text{[Equation 1]}$$

In Equation 1, μ is a mobility of the first pixel switching element T1. Cox is a capacitance per unit area of the first pixel switching element T1. W/L is a width to length ratio of the first pixel switching element T1. VSG is a voltage between the input electrode (i.e., second pixel node N2) of the first pixel switching element T1 and the first pixel node (also referred to as a control pixel node) N1 of the first pixel switching element T1. |VTF| is the threshold voltage of the first pixel switching element T1.

The voltage VG of the first pixel node N1 after the compensation of the threshold voltage |VTF| during the second duration DU2 may be represented as following Equation 2.

$$VG = \text{VDATA} - |VTH| \quad \text{[Equation 2]}$$

When the organic light emitting element OLED emits the light during the fourth duration DU4, the driving voltage VOV and the driving current ISD may be represented as following Equations 3 and 4. In Equation 3, VS is a voltage of the second pixel node N2.

$$VOV = VS - VG - |VTH| = ELVDD - (VDATA - |VTH|) - |VTH| = ELVDD - VDATA \quad \text{[Equation 3]}$$

$$ISD = \frac{1}{2}\mu Cox\frac{W}{L}(ELVDD - VDATA)^2 \quad \text{[Equation 4]}$$

The threshold voltage |VTF| is compensated during the second duration DU2, so that the driving current ISD may be determined regardless of the threshold voltage |VTF| of the first pixel switching element T1 when the organic light emitting element OLED emits the light during the fourth duration DU4.

Figure 4:
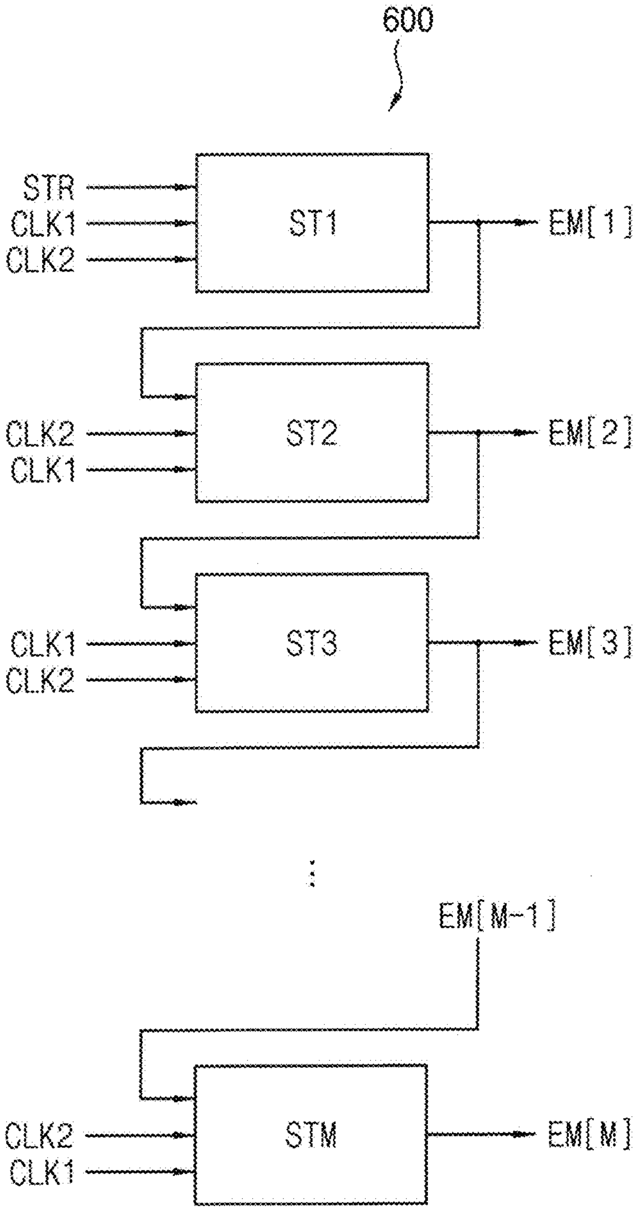
FIG. 4 is a block diagram illustrating an emission driver of FIG. 1.
Figure 5:
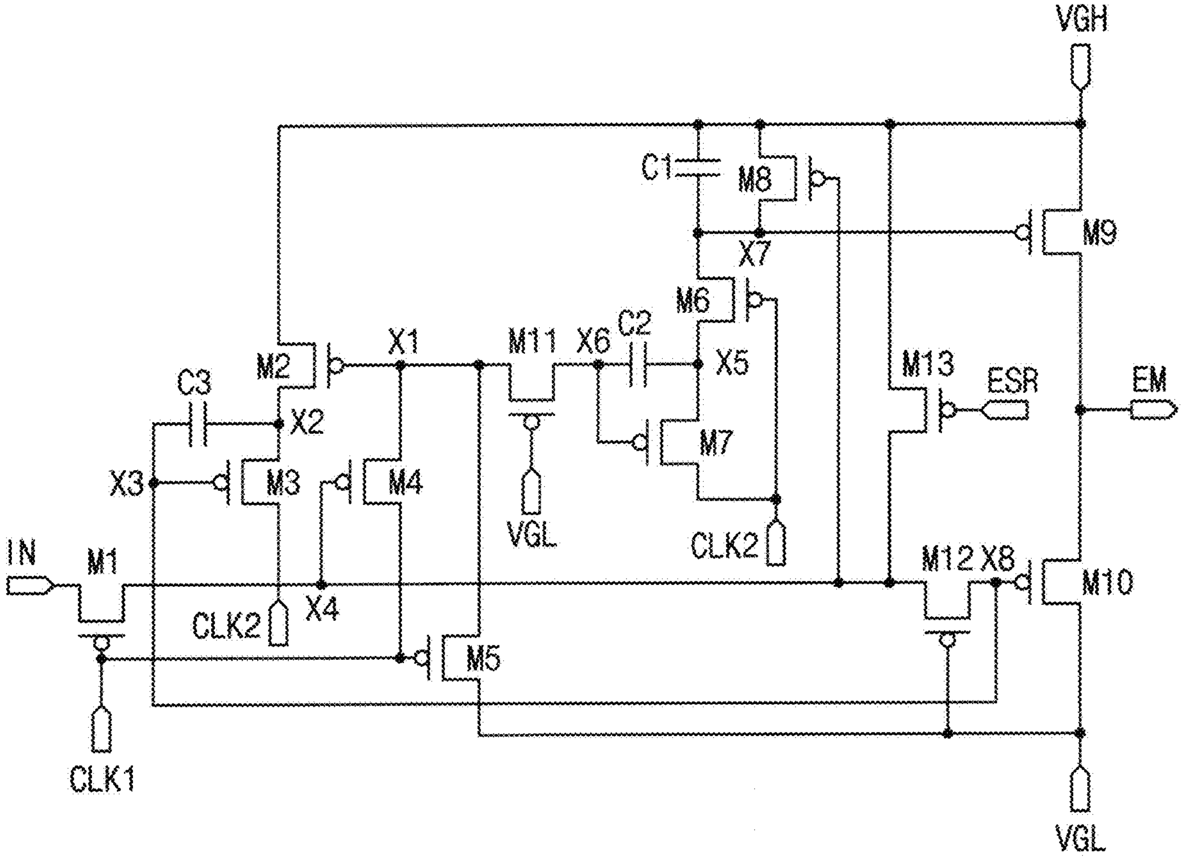
FIG. 5 is a circuit diagram illustrating a stage of the emission driver of FIG. 4.
Figure 6:
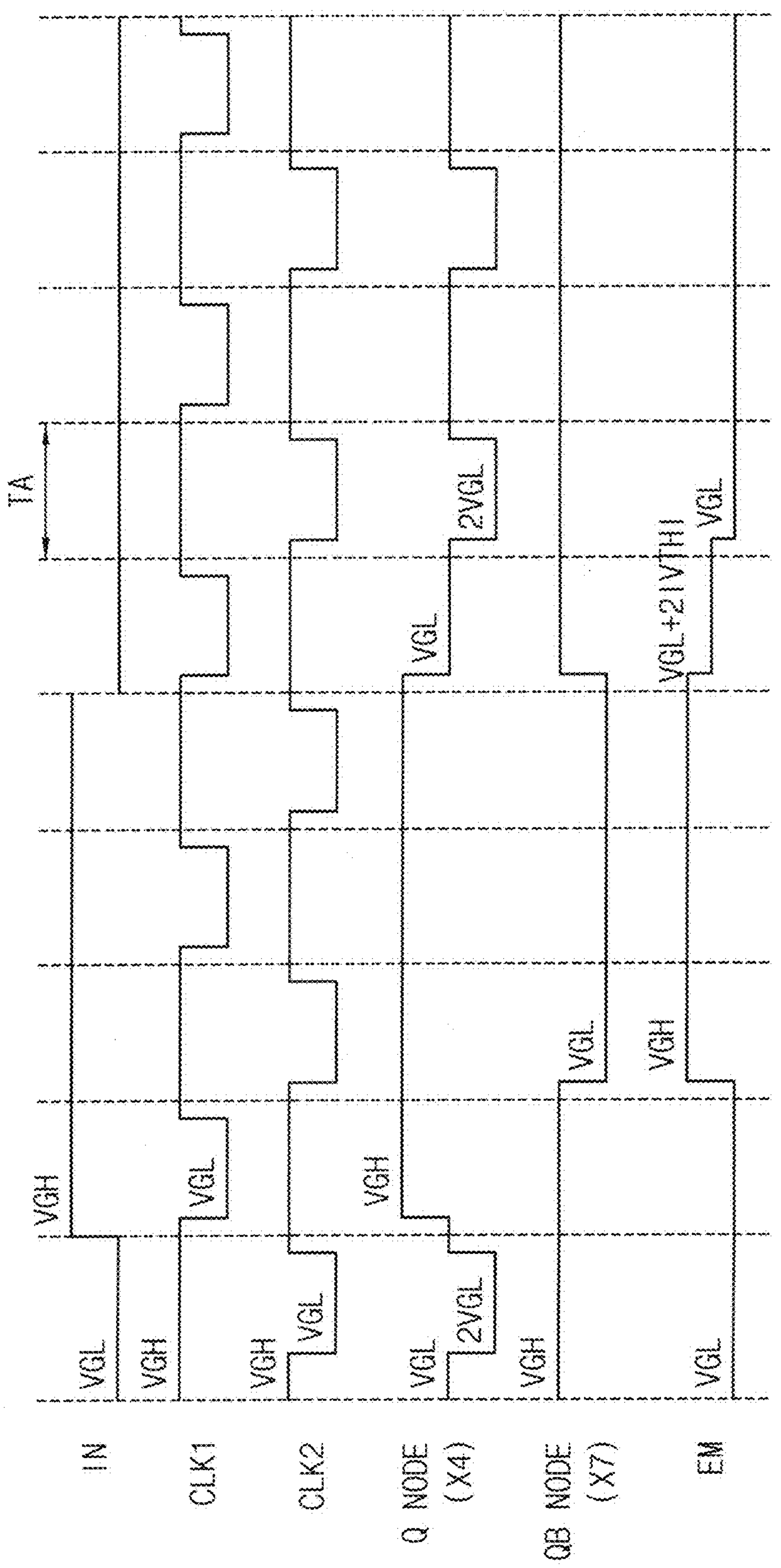
FIG. 6 is a timing diagram illustrating an input signal, an output signal and a control signal of the stage of FIG. 5.

FIG. 4 is a block diagram illustrating the emission driver 600 of FIG. 1. FIG. 5 is a circuit diagram illustrating a stage of the emission driver 600 of FIG. 4. FIG. 6 is a timing diagram illustrating an input signal, an output signal and a control signal of the stage of FIG. 5.

Referring to FIGS. 1 to 5, the emission driver 600 includes a plurality of stages ST1 to STM where M is a natural number.

The stages ST1 to STM output the emission signal EM to a display region of the display panel 100. In an embodiment, the number of the stages ST1 to STM may be same as the number of the emission lines EL of the display region, for example. In an embodiment, the number of the stages ST1 to STM may be same as the number of pixel rows of the display region of the display panel 100, for example.

At least one of the stages ST1 to STM may receive a start signal STR, a first clock signal CLK1, a second clock signal CLK2, a protection signal ESR, a first gate power voltage VGH and a second gate power voltage VGL and output the emission signal EM. The first gate power voltage VGH is a high gate power voltage. The second gate power voltage VGL is a low gate power voltage. A timing of the first clock signal CLK1 may be different from the second clock signal CLK2.

Each stage ST1 to STM outputs the emission signal EM and the emission signal EM is inputted to an input terminal of a next stage. A start signal of the stage may be the emission signal EM of a previous stage. The first stage does not have a previous stage so that a start signal STR may be inputted to an input terminal of the first stage ST1.

An emission signal EM[1] of the first stage ST1 is outputted to the display region through a first emission line. The emission signal EM[1] of the first stage ST1 is applied to an input terminal of a second stage ST2.

An emission signal EM[2] of the second stage ST2 is outputted to the display region through a second emission line. The emission signal EM[2] of the second stage ST2 is applied to an input terminal of a third stage ST3.

An emission signal EM[3] of the third stage ST3 is outputted to the display region through a third emission line. The emission signal EM[3] of the third stage ST3 is applied to an input terminal of a fourth stage ST4.

An emission signal EM[M] of an M-th stage STM is outputted to the display region through an M-th emission line. The emission signal EM[M−1] of an (M−1)-th stage is applied to an input terminal of the M-th stage STM.

The first clock signal CLK1 and the second clock signal CLK2 may be alternately applied to the stages. In an embodiment, the first clock signal CLK1 may be applied to a first clock terminal of the first stage ST1 and the second clock signal CLK2 may be applied to a second clock terminal of the first stage ST1, for example. In contrast, the second clock signal CLK2 may be applied to a first clock terminal of the second stage ST2 and the first clock signal CLK1 may be applied to a second clock terminal of the second stage ST2. The first clock signal CLK1 may be applied to a first clock terminal of the third stage ST3 and the second clock signal CLK2 may be applied to a second clock terminal of the third stage ST3.

At least one of the stages may include a ninth switching element M9 connected between a first gate power voltage terminal to which the first gate power voltage VGH is applied and an emission signal output terminal outputting the emission signal EM and a tenth switching element M10 connected between a second gate power voltage terminal to which the second gate power voltage VGL is applied and the emission signal output terminal.

The ninth switching element M9 may be a pull-up switching element pulling up the emission signal EM to the first gate power voltage VGH. The tenth switching element M10 may be a pull-down switching element pulling down the emission signal EM to the second gate power voltage VGL.

The stage may further include a thirteenth switching element M13 applying the first gate power voltage VGH to a control electrode of the tenth switching element M10 in response to the protection signal ESR. The thirteenth switching element M13 is also referred to as a protection switching element.

The stage may include a pull-down part for operating of pulling down the emission signal EM to the second gate power voltage VGL. The pull-down part may include a first switching element M1, a second switching element M2, a third switching element M3, the tenth switching element M10 and a twelfth switching element M12.

The first switching element M1 may output the start signal (STR or EM of the previous stage) to a fourth node X4 in response to the first clock signal CLK1. A control electrode of the first switching element M1 may be connected to the first clock terminal to which the first clock signal CLK1 is applied. An input electrode of the first switching element M1 may be connected to an input terminal IN to which an input signal (e.g., the start signal) is applied. An output electrode of the first switching element M1 may be connected to the fourth node X4.

The second switching element M2 may output the first gate power voltage VGH to a second node X2 in response to a voltage of a first node X1. A control electrode of the second switching element M2 may be connected to the first node X1. An input electrode of the second switching element M2 may be connected to the first gate power voltage terminal. An output electrode of the second switching element M2 may be connected to the second node X2.

The third switching element M3 may output the second clock signal CLK2 to the second node X2 in response to a voltage of a third node X3. A control electrode of the third switching element M3 may be connected to the third node X3. An input electrode of the third switching element M3 may be connected to the second clock terminal to which the second clock signal CLK2 is applied. An output electrode of the third switching element M3 may be connected to the second node X2.

The tenth switching element M10 may output the second gate power voltage VGL to the emission signal output terminal outputting the emission signal EM in response to a voltage of an eighth node X8. A control electrode of the tenth switching element M10 may be connected to the eighth node X8. An input electrode of the tenth switching element M10 may be connected to the second gate power voltage terminal. An output electrode of the tenth switching element M10 may be connected to the emission signal output terminal.

The twelfth switching element M12 may output a voltage of the fourth node X4 to the eighth node X8 in response to the second gate power voltage VGL. A control electrode of the twelfth switching element M12 may be connected to the second gate power voltage terminal. An input electrode of the twelfth switching element M12 may be connected to the fourth node X4. An output electrode of the twelfth switching element M12 may be connected to the eighth node X8.

The stage may include a pull-up part for operating of pulling up the emission signal EM to the first gate power voltage VGH. The pull-up part may include a fourth switching element M4, a fifth switching element M5, a sixth switching element M6, a seventh switching element M7, an eighth switching element M8, the ninth switching element M9 and an eleventh switching element M11.

The fourth switching element M4 may output the first clock signal CLK1 to the first node X1 in response to the voltage of the fourth node X4. A control electrode of the fourth switching element M4 may be connected to the fourth node X4. An input electrode of the fourth switching element M4 may be connected to the first clock terminal. An output electrode of the fourth switching element M4 may be connected to the first node X1.

The fifth switching element M5 may output the second gate power voltage VGL to the first node X1 in response to the first clock signal CLK1. A control electrode of the fifth switching element M5 may be connected to the first clock terminal. An input electrode of the fifth switching element M5 may be connected to the second gate power voltage terminal. An output electrode of the fifth switching element M5 may be connected to the first node X1.

The sixth switching element M6 may connect a fifth node X5 to a seventh node X7 in response to the second clock signal CLK2. A control electrode of the sixth switching element M6 may be connected to the second clock terminal. An input electrode of the sixth switching element M6 may be connected to the fifth node X5. An output electrode of the sixth switching element M6 may be connected to the seventh node X7.

The seventh switching element M7 may output the second clock signal CLK2 to the fifth node X5 in response to a voltage of the sixth node X6. A control electrode of the seventh switching element M7 may be connected to the sixth node X6. An input electrode of the seventh switching element M7 may be connected to the second clock terminal. An output electrode of the seventh switching element M7 may be connected to the fifth node X5.

The eighth switching element M8 may output the first gate power voltage VGH to the seventh node X7 in response to the voltage of the fourth node X4. A control electrode of the eighth switching element M8 may be connected to the fourth node X4. An input electrode of the eighth switching element M8 may be connected to the first gate power voltage terminal. An output electrode of the eighth switching element M8 may be connected to the seventh node X7.

The ninth switching element M9 may output the first gate power voltage VGH to the emission signal output terminal in response to the voltage of the seventh node X7. A control electrode of the ninth switching element M9 may be connected to the seventh node X7. An input electrode of the ninth switching element M9 may be connected to the first gate power voltage terminal. An output electrode of the ninth switching element M9 may be connected to the emission signal output terminal.

The eleventh switching element M11 may connect the first node X1 to the sixth node X6 in response to the second gate power voltage VGL. A control electrode of the eleventh switching element M11 may be connected to the second gate power voltage terminal. An input electrode of the eleventh switching element M11 may be connected to the first node X1. An output electrode of the eleventh switching element M11 may be connected to the sixth node X6.

The stage may further include a first capacitor C1, a second capacitor C2 and a third capacitor C3. The first capacitor C1 may include a first electrode connected to the first gate power voltage terminal and a second electrode connected to the seventh node X7. The second capacitor C2 may include a first electrode connected to the fifth node X5 and a second electrode connected to the sixth node X6. The third capacitor C3 may include a first electrode connected to the second node X2 and a second electrode connected to the third node X3.

The first capacitor C1 may be a stabilization capacitor for stabilizing the voltage of the seventh node X7. The second capacitor C2 may be a boosting capacitor for pulling down the voltage of the seventh node X7 to a low level. The third capacitor C3 may be a boosting capacitor for pulling down the voltage of the eighth node X8 to a low level.

In the illustrated embodiment, the thirteenth switching element M13 may be connected to the fourth node X4.

The fourth node X4 may be also referred to as a Q node. In addition, the eighth node X8 is connected to the fourth node X4 in response to the second gate power voltage VGL applied to the twelfth switching element M12 so that the eighth node X8 may be also referred to as the Q node. The seventh node X7 may be also referred to as a QB node.

In an embodiment, the first to thirteenth switching elements M1 to M13 may be p-type TFTs, for example. The control electrodes of the first to thirteenth switching elements M1 to M13 may be gate electrodes, the input electrodes of the first to thirteenth switching elements M1 to M13 may be source electrodes and the output electrodes of the first to thirteenth switching elements M1 to M13 may be drain electrodes.

When the first clock signal CLK1 has the low level VGL while the high level VGH is applied to the input terminal IN, the voltage of the fourth node X4 increases to the high level VGH applied to the input terminal IN. Here, the term "low level VGL" may mean a level of the second gate power voltage VGL, and the term "high level VGH" may mean a level of the first gate power voltage VGH for convenience.

Then, when the second clock signal CLK2 has the low level VGL, the voltage of the seventh node X7 decreases to the low level VGL and the emission signal EM increases to the high level VGH.

When the first clock signal CLK1 has the low level VGL while the signal of the input terminal IN decreases to the low level VGL, the voltage of the fourth node X4 decreases to a first low level (e.g. VGL), the voltage of the seventh node X7 increases to the high level VGH and the emission signal EM decreases to an intermediate level VGL+2|VTH|. The intermediate level VGL+2|VTH| of the emission signal EM has a level slightly higher than the second gate power voltage VGL. A 2|VTH| component of the intermediate level VGL+2|VTH| of the emission signal EM may be a threshold volte of the first switching element M1 and a threshold voltage of the tenth switching element M10.

Then, when the second clock signal CLK2 has the low level VGL, the voltage of the fourth node X4 decreases to a second low level 2VGL. Herein, the emission signal EM decreases from the VGL+2|VTH| to the low level VGL. When the intermediate level VGL+2|VTH| or the low level VGL of the emission signal is applied to the display panel 100 the display panel 100 may be turned on. Although the intermediate level VGL+2|VTH| is not shown in FIG. 3 for convenience of explanation, the emission signal EM may temporally have the intermediate level VGL+2|VTH| in an initial period of the fourth period DU4.

When the signal of the input terminal maintains the low level VGL, the second clock signal CLK2 swings between the first low level VGL and the second low level 2VGL according to the waveform of the second clock signal CLK2.

Figure 7:
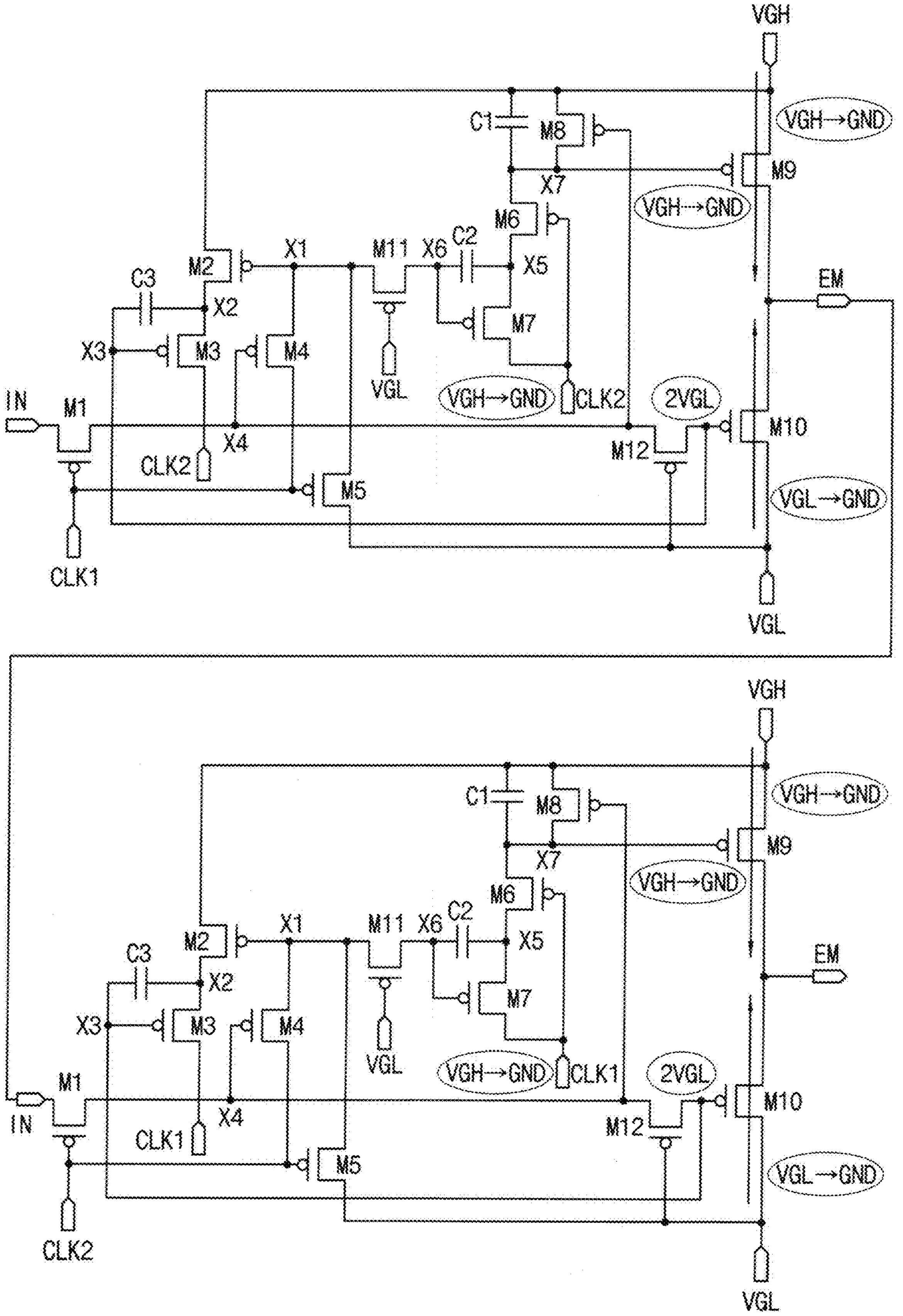
FIG. 7 is a conceptual diagram illustrating an abnormal off operation of the emission driver of FIG. 1 when the stage of FIG. 5 does not include a thirteenth switching element.

FIG. 7 is a conceptual diagram illustrating an abnormal off operation of the emission driver of FIG. 1 when the stage of FIG. 5 does not include the thirteenth switching element M13.

FIG. 7 illustrates the stage of FIG. 5 except that the stage does not include the thirteenth switching element M13 to explain the function of the thirteenth switching element M13.

FIG. 7 assumes a situation in which the display apparatus is turned off abnormally and suddenly, and, for example, the abnormal off situation may be an instantaneous detachment of a battery.

Referring to FIG. 7, the first gate power voltage VGH, the second gate power voltage VGL, the first clock signal CLK1 and the second clock signal CLK2 may gradually return to a ground level GND in an abnormal off situation.

In an embodiment, when the abnormal off situation is TA period (refer to FIG. 6), the emission signal EM may have the low level VGL, the voltage of the fourth node X4 may have the second low level 2VGL and the voltage of the seventh node X7 may have the high level, for example.

Herein, the tenth switching element M10 may have a turned-on state by the voltage of the fourth node X4. In the abnormal off situation, the voltage of the seventh node X7 decreases to the ground level GND so that the ninth switching element M9 and the tenth switching element M10 may be simultaneously turned on.

When the ninth switching element M9 and the tenth switching element M10 are simultaneously turned on, the first gate power voltage VGH and the second gate power voltage VGL may be shorted so that the all of the emission signal EM of the emission driver 600 may instantly have the ground level GND.

When all of the emission signal EM of the emission driver 600 instantly have the ground level GND, the low level is applied to the fifth pixel switching element T5 of FIG. 2 and the sixth pixel switching element T6 of FIG. 2 so that the display panel 100 may flash as a whole.

Figure 8A:
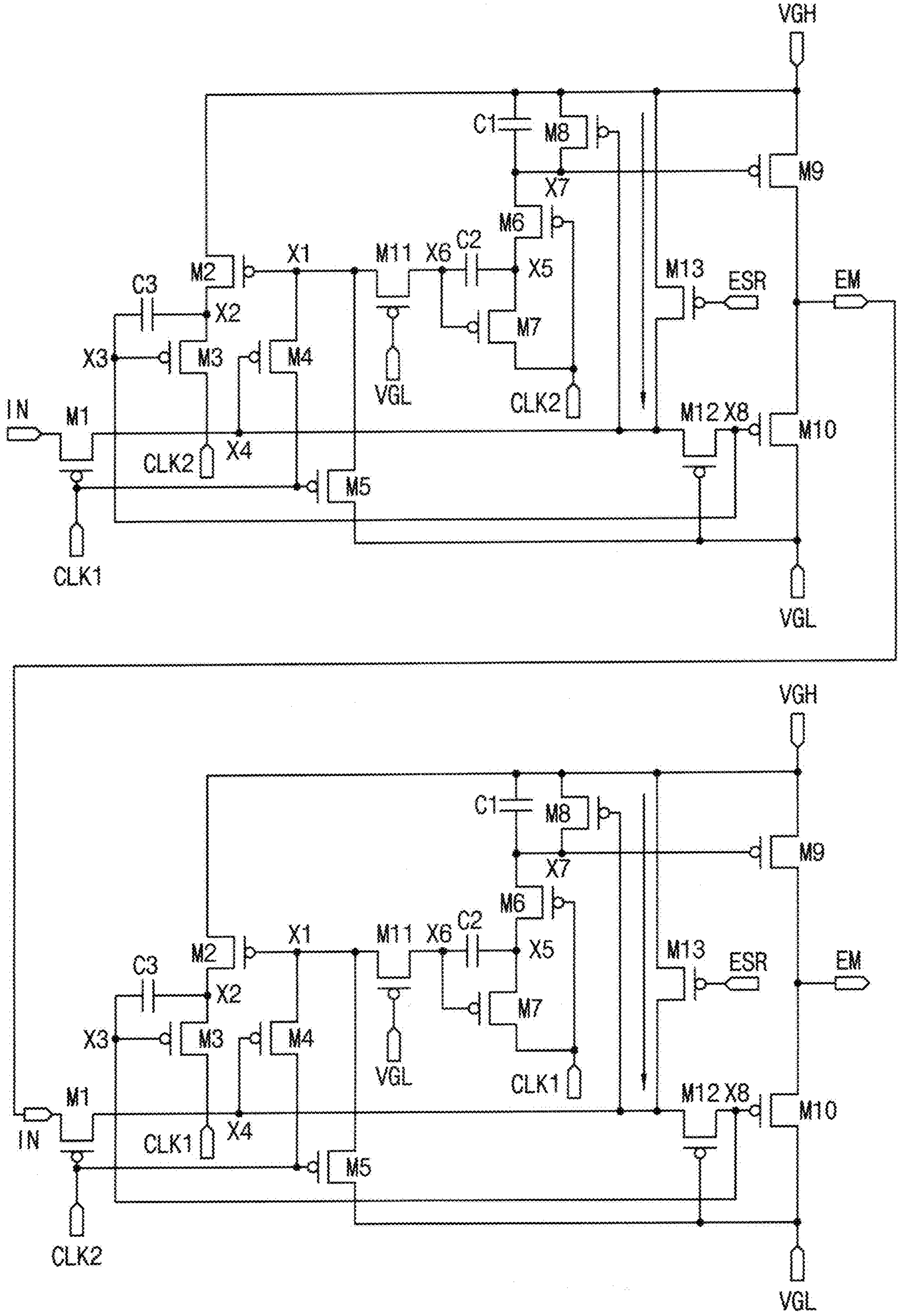
FIG. 8A is a conceptual diagram illustrating an embodiment of an abnormal off operation of the emission driver of FIG. 1 according to the invention.

FIG. 8A is a conceptual diagram illustrating an embodiment of an abnormal off operation of the emission driver of FIG. 1 according to the invention.

FIG. 8A illustrates the stage of FIG. 5 including the thirteenth switching element M13. FIG. 8A assumes a situation in which the display apparatus is turned off abnormally and suddenly as assumed in FIG. 7.

Referring to FIG. 8A, the protection signal ESR applied to the thirteenth switching element M13 may turn on the thirteenth switching element M13 in an initial driving period and may turn off the thirteenth switching element M13 in a normal driving period after the initial driving period.

Before the abnormal off situation, the display apparatus may be normally driven so that the protection signal ESR may have a high level and the thirteenth switching element M13 may have a turned-off state.

A capacitance of a line applying the first gate power voltage VGH may be greater than a capacitance of a line applying the protection signal ESR. A width of the line applying the first gate power voltage VGH may be greater than a width of the line applying the protection signal ESR. In addition, a load of the line applying the first gate power voltage VGH may be greater than a load of the line applying the protection signal ESR. An average level of the first gate power voltage VGH is substantially greater than an average level of the protection signal ESR.

For this reason, when the display apparatus is abnormally turned off, the protection signal ESR applied to the control electrode of the thirteenth switching element M13 decreases faster than the first gate power voltage VGH applied to the input electrode of the thirteenth switching element M13 so that the thirteenth switching element M13 is turned on and the tenth switching element M10 is turned off.

In the illustrated embodiment, the tenth switching element M10 is turned off in the abnormal off situation so that the ninth switching element M9 and the tenth switching element M10 are not simultaneously turned on unlike FIG. 7. Thus, the first gate power voltage VGH and the second gate power voltage VGL are not shorted so that the flashing of the display panel 100 may be prevented.

Figure 8B:
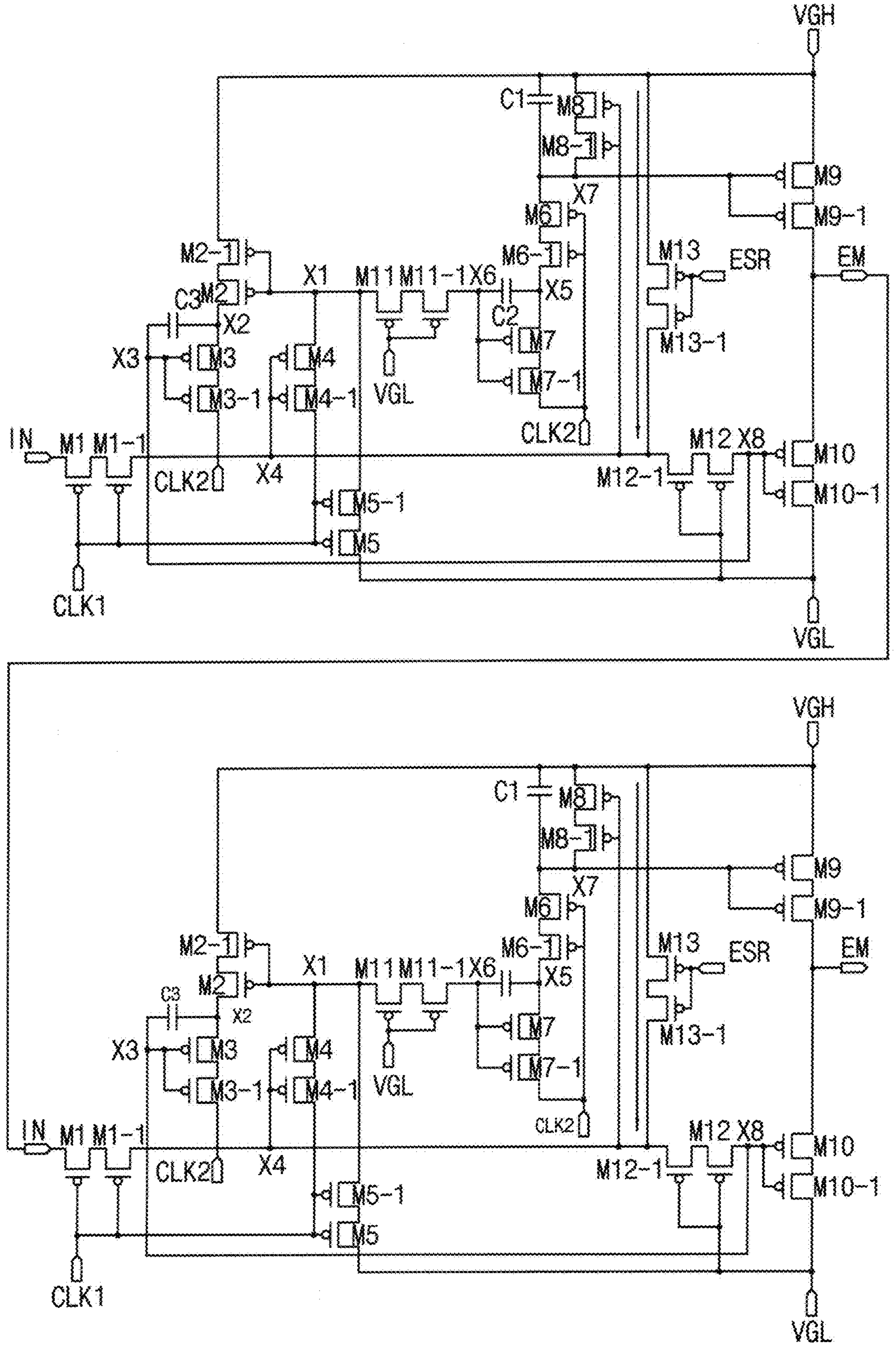
FIG. 8B is a conceptual diagram illustrating an embodiment of an abnormal off operation of the emission driver of FIG. 1 according to the invention.

FIG. 8B is a conceptual diagram illustrating an embodiment of an abnormal off operation of the emission driver of FIG. 1 according to the invention.

In FIG. 8B, each of the switching elements of the stage of the emission driver 600 may include dual gate electrodes.

The stage of the emission driver may include dual gate switching elements M1, M1-1, M2, M2-1, M3, M3-1, M4, M4-1, M5, M5-1, M6, M6-1, M7, M7-1, M8, M8-1, M9, M9-1, M10, M10-1, M11, M11-1, M12, M12-1, M13 and M13-1. The dual gate switching element may include switching elements forming a pair and connected to each other in series.

The circuit diagram of FIG. 8B may be substantially the same as the circuit diagram of FIG. 8A except that each of the switching elements of the stage of the emission driver 600 is the dual gate switching element.

Figure 9:
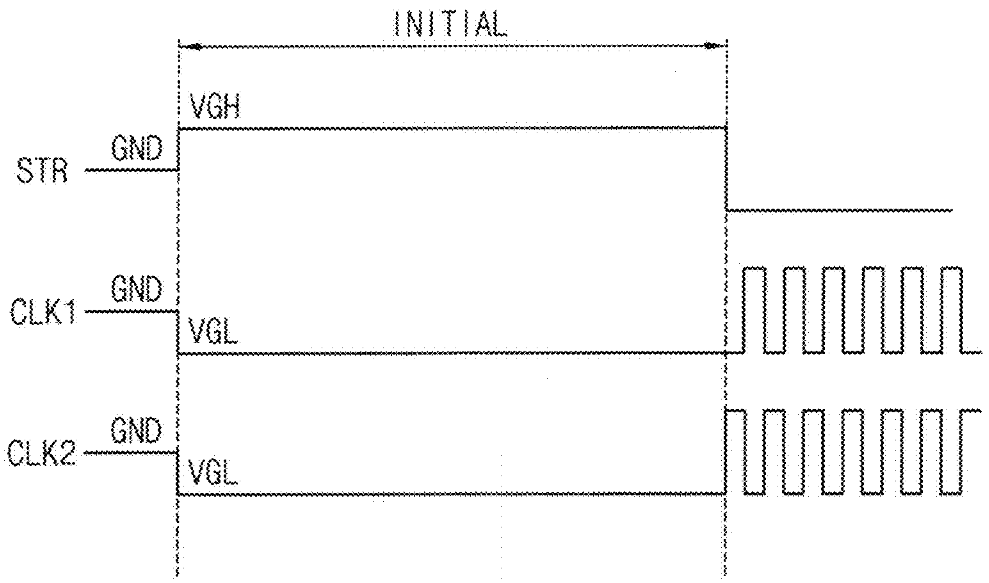
FIG. 9 is a timing diagram illustrating an initial driving operation of the emission driver of FIG. 1 when the stage of FIG. 5 does not include the thirteenth switching element.
Figure 10:
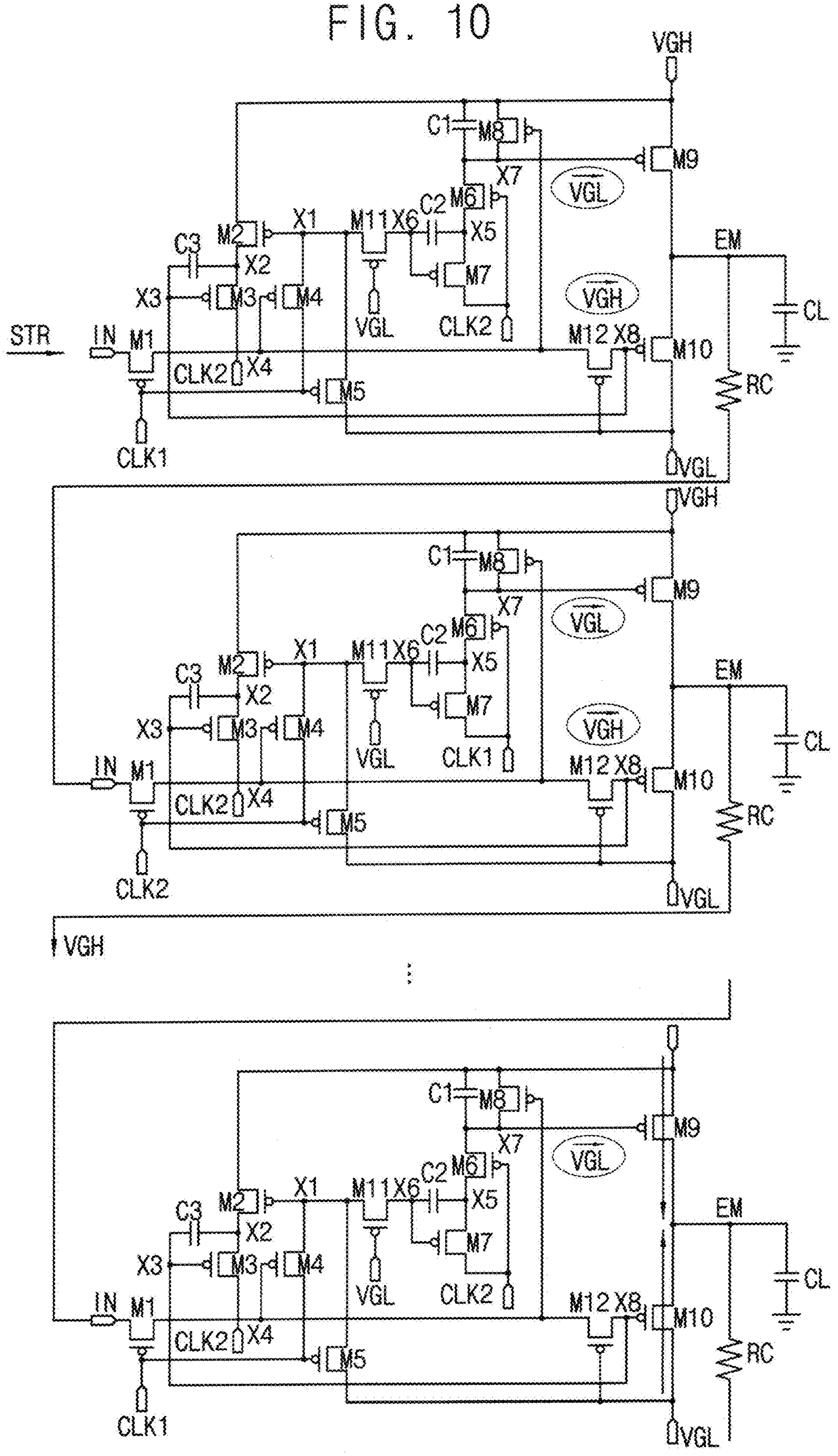
FIG. 10 is a conceptual diagram illustrating the initial driving operation of the emission driver of FIG. 1 when the stage of FIG. 5 does not include the thirteenth switching element.

FIG. 9 is a timing diagram illustrating an initial driving operation of the emission driver of FIG. 1 when the stage of FIG. 5 does not include the thirteenth switching element. FIG. 10 is a conceptual diagram illustrating the initial driving operation of the emission driver of FIG. 1 when the stage of FIG. 5 does not include the thirteenth switching element.

FIGS. 9 and 10 illustrate the stage of FIG. 5 except that the stage does not include the thirteenth switching element M13 to explain the function of the thirteenth switching element M13.

Referring to FIGS. 9 and 10, in an initial driving period INITIAL, the start signal STR may have the first gate power voltage VGH, the first clock signal CLK1 may have the second gate power voltage VGL and the second clock signal CLK2 may have the second gate power voltage VGL.

In FIG. 10, in the initial driving period INITIAL, the start signal STR is applied to a first stage and both of the first clock signal CLK1 and the second clock signal CLK2 of the first stage may have a low level. Accordingly, the control electrode of the ninth switching element M9 may have the low level and the control electrode of the tenth switching element M10 may have the high level. Then, the ninth switching element M9 is turned on and the tenth switching element M10 is turned off so that the emission signal EM may output the high level.

The high level of the emission signal EM outputted from the first stage is applied to a next stage as a carry signal so that the stages of the emission driver 600 respectively output the emission signal EM in a cascade manner.

However, when the emission signal EM is applied to the next stage, a propagation delay may be generated by a wiring resistance RC and a load capacitance CL. At a last stage of the emission driver 600 in FIG. 10, when the ninth switching element M9 is tuned on, the tenth switching element M10 is desirable to be turned off. However, at the last stage of the emission driver 600 in FIG. 10, when the ninth switching element M9 is tuned on, the tenth switching element M10 may be turned on due to the propagation delay so that the ninth switching element M9 and the tenth switching element M10 may be simultaneously turned on.

When the ninth switching element M9 and the tenth switching element M10 are simultaneously turned on, the first gate power voltage VGH and the second gate power voltage VGL may be shorted so that the all of the emission signal EM of the emission driver 600 may instantly have the ground level GND.

When all of the emission signal EM of the emission driver 600 instantly have the ground level GND, the low level is applied to the fifth pixel switching element T5 of FIG. 2 and the sixth pixel switching element T6 of FIG. 2 so that the display panel 100 may flash as a whole.

Figure 11:
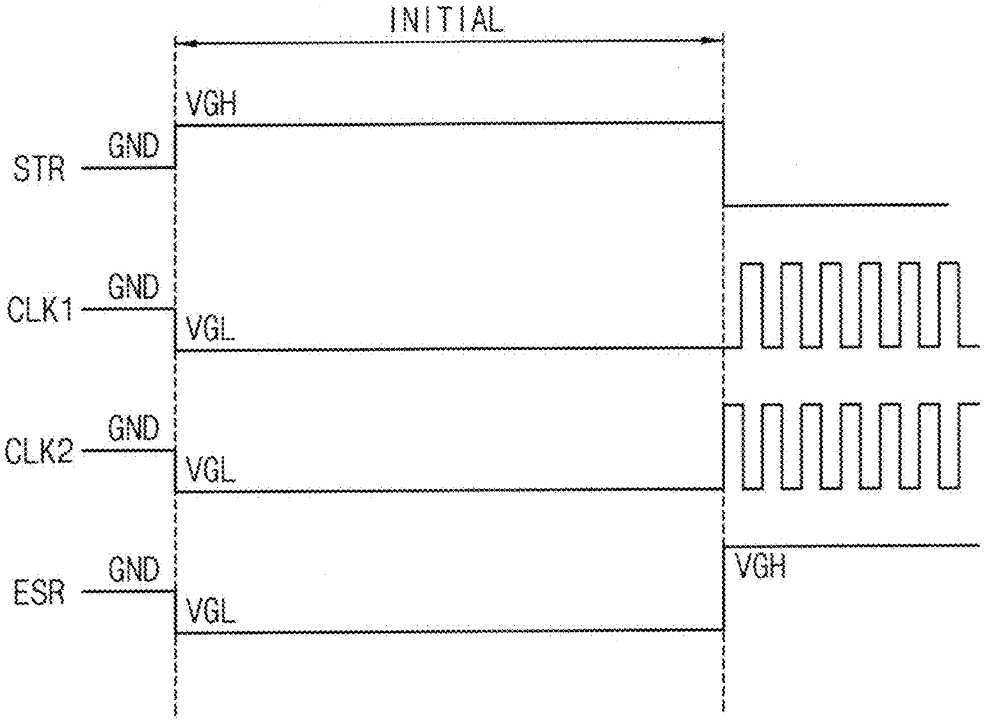
FIG. 11 is a timing diagram illustrating an initial driving operation of the emission driver of FIG. 1.
Figure 12:
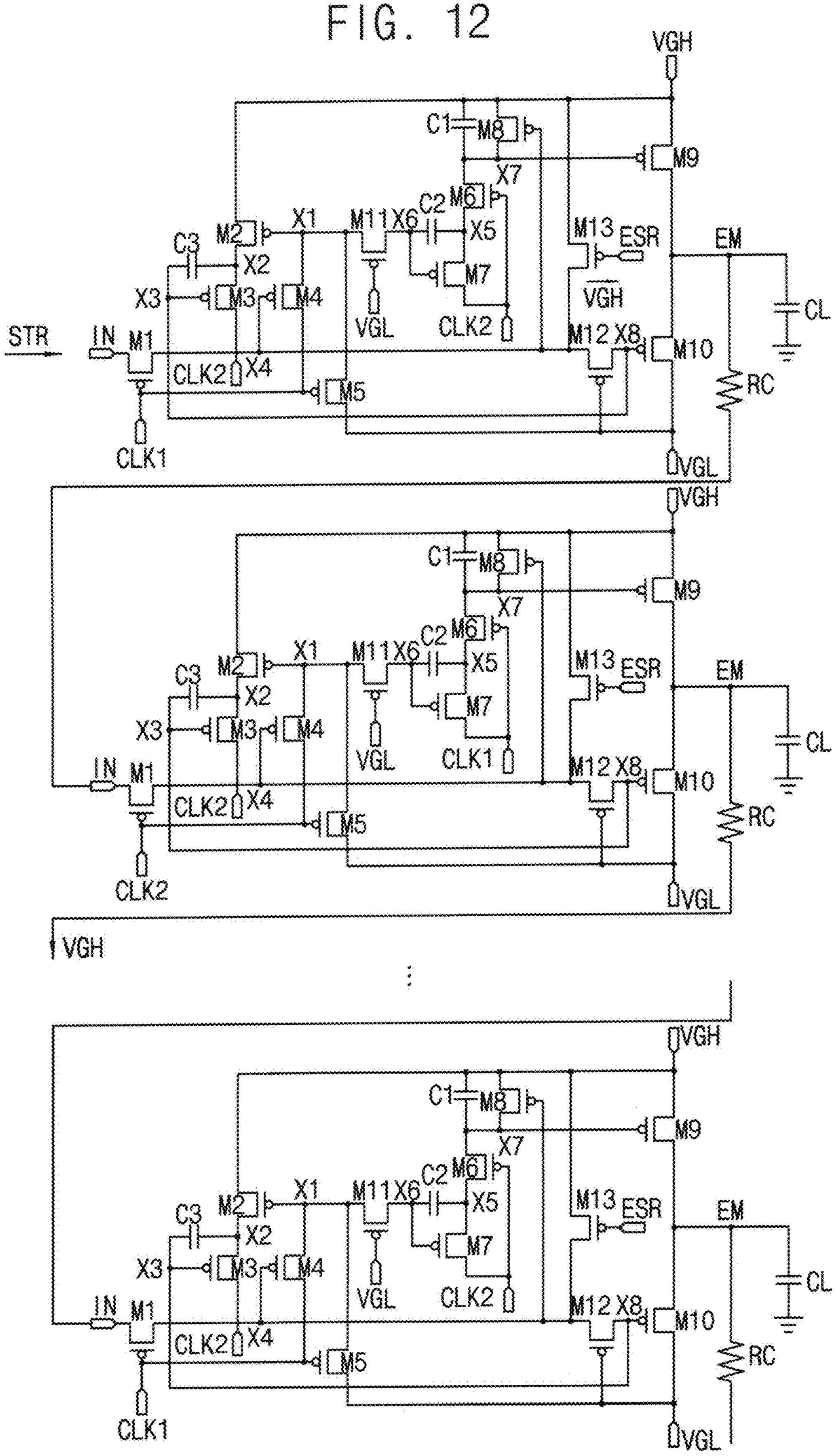
FIG. 12 is a conceptual diagram illustrating the initial driving operation of the emission driver of FIG. 1.

FIG. 11 is a timing diagram illustrating an initial driving operation of the emission driver 600 of FIG. 1. FIG. 12 is a conceptual diagram illustrating the initial driving operation of the emission driver 600 of FIG. 1.

FIGS. 11 and 12 illustrate the stage of FIG. 5 including the thirteenth switching element M13. FIGS. 11 and 12 represent an operation of the emission driver 600 in the initial driving period INITIAL.

Referring to FIGS. 11 and 12, in the initial driving period INITIAL, the start signal STR may have the first gate power voltage VGH, the first clock signal CLK1 may have the second gate power voltage VGL and the second clock signal CLK2 may have the second gate power voltage VGL.

In addition, the protection signal ESR may turn on the thirteenth switching element M13 in the initial driving period INITIAL and may turn off the thirteenth switching element M13 in a normal driving period after the initial driving period INITIAL.

In an embodiment, the protection signal ESR may have the second gate power voltage VGL in the initial driving period INITIAL, for example.

In the initial driving period INITIAL, the thirteenth switching element M13 is turned on by the low level of the protection signal ESR and the fourth node X4 is initialized to the first gate power voltage VGH. Thus, in the initial driving period INITIAL, the tenth switching element M10 is surely turned off.

In the illustrated embodiment, the tenth switching element M10 is turned off in the initial driving period INITIAL so that the ninth switching element M9 and the tenth switching element M10 are not simultaneously turned on unlike FIG. 10. Thus, the first gate power voltage VGH and the second gate power voltage VGL are not shorted so that the flashing of the display panel 100 may be prevented.

According to the illustrated embodiment, the stage of the emission driver 600 includes the flashing preventing switching element M13 so that the image flashing occurred at the initial driving period and the abnormal off situation may be prevented. Thus, the display quality of the display panel may be enhanced.

Figure 13:
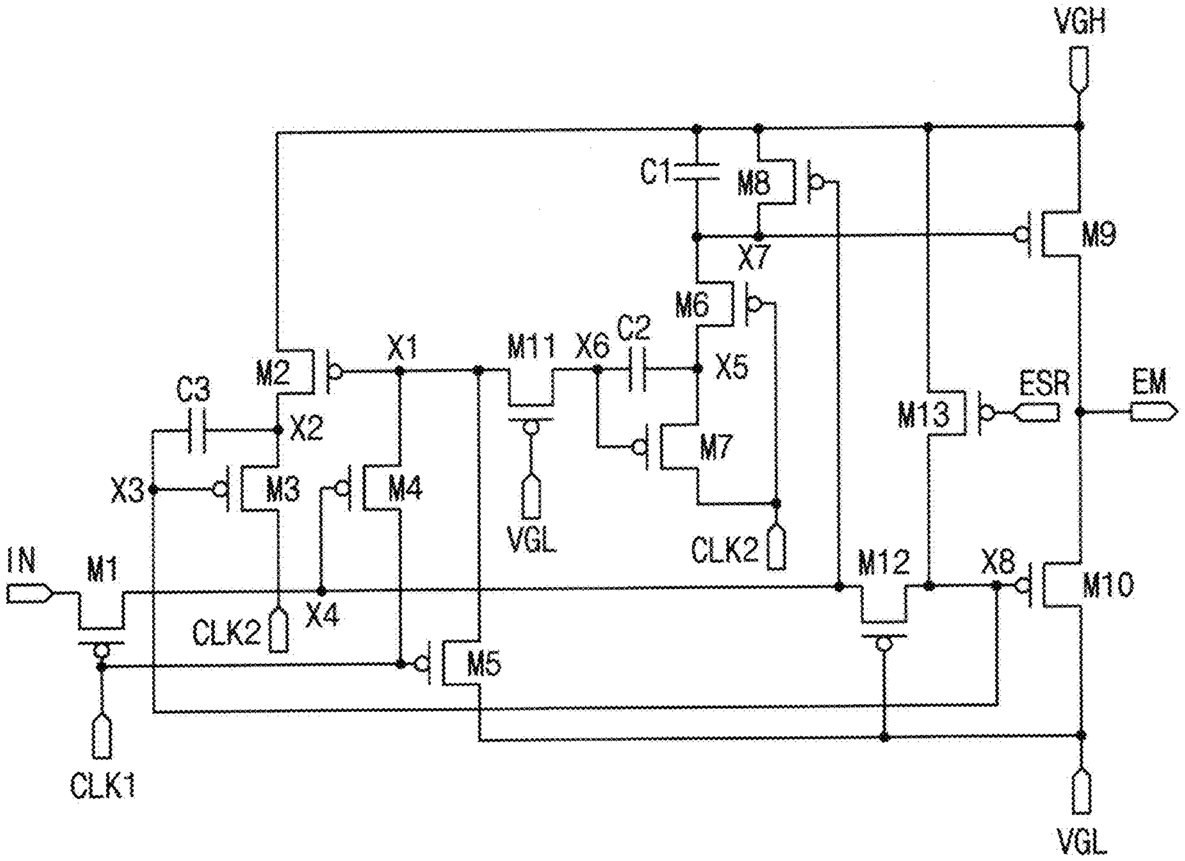
FIG. 13 is a circuit diagram illustrating an embodiment of a stage of an emission driver of a display apparatus of according to the invention.

FIG. 13 is a circuit diagram illustrating an embodiment of a stage of an emission driver of a display apparatus of according to the invention.

The emission driver, the display apparatus and the method of driving the display apparatus in the illustrated embodiment is substantially the same as the emission driver, the display apparatus and the method of driving the display apparatus of the previous embodiment explained referring to FIGS. 1 to 12 except for the connection of the thirteenth switching element. Thus, the same reference numerals will be used to refer to the same or like parts as those described in the previous embodiment of FIGS. 1 to 12 and any repetitive explanation concerning the above elements will be omitted.

Referring to FIG. 13, at least one of the stages may include a ninth switching element M9 connected between a first gate power voltage terminal to which the first gate power voltage VGH is applied and an emission signal output terminal outputting the emission signal EM and a tenth switching element M10 connected between a second gate power voltage terminal to which the second gate power voltage VGL is applied and the emission signal output terminal.

The ninth switching element M9 may be a pull-up switching element pulling up the emission signal EM to the first gate power voltage VGH. The tenth switching element M10 may be a pull-down switching element pulling down the emission signal EM to the second gate power voltage VGL.

The stage may further include a thirteenth switching element M13 applying the first gate power voltage VGH to a control electrode of the tenth switching element M10 in response to the protection signal ESR.

In the illustrated embodiment, the eighth node X8 may be connected to the thirteenth switching element M13.

In an embodiment, each of the switching elements of the stage of the emission driver 600 of FIG. 13 may include dual gate electrodes similarly to FIG. 8B, for example.

According to the illustrated embodiment, the stage of the emission driver 600 includes the flashing preventing switching element M13 so that the image flashing occurred at the initial driving period and the abnormal off situation may be prevented. Thus, the display quality of the display panel may be enhanced.

According to the invention as explained above, the display quality of the display panel may be enhanced.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the predetermined embodiments disclosed, and that modifications to the disclosed embodiments, as well as other embodiments.

What is claimed is:

1. An emission driver comprising a plurality of stages,
- wherein a stage of the plurality of stages receives a start signal, a first clock signal, a second clock signal, a protection signal, a first gate power voltage and a second gate power voltage and outputs an emission signal, and
- wherein the stage of the plurality of stages comprises:
  - a pull-up switching element connected between a first gate power voltage terminal which receives the first gate power voltage and an emission signal output terminal which outputs the emission signal;
  - a pull-down switching element connected between a second gate power voltage terminal which receives the second gate power voltage and the emission signal output terminal; and
  - a protection switching element connected between the first gate power voltage terminal and a control electrode of the pull-down switching element.

2. The emission driver of claim 1, wherein the stage of the plurality of stages further comprises:
- a twelfth switching element connected between a first electrode of the protection switching element and the control electrode of the pull-down switching element.

3. The emission driver of claim 2, wherein a control electrode of the twelfth switching element is connected to the second gate power voltage terminal.

4. The emission driver of claim 1, wherein the stage of the plurality of stages further comprises:
- a first switching element which applies the start signal to a fourth node in response to the first clock signal;
- a second switching element which applies the first gate power voltage to a second node in response to a voltage of a first node;
- a third switching element which applies the second clock signal to the second node in response to a voltage of a third node; and
- a twelfth switching element which applies a voltage of the fourth node to an eighth node in response to the second gate power voltage.

5. The emission driver of claim 4, wherein the stage of the plurality of stages further comprises:
- a fourth switching element which applies the first clock signal to the first node in response to the voltage of the fourth node;
- a fifth switching element which applies the second gate power voltage to the first node in response to the first clock signal;
- a sixth switching element which connects a fifth node to a seventh node in response to the second clock signal;
- a seventh switching element which applies the second clock signal to the fifth node in response to a voltage of a sixth node;
- an eighth switching element which applies the first gate power voltage to the seventh node in response to the voltage of the fourth node; and
- an eleventh switching element which connects the first node to the sixth node in response to the second gate power voltage.

6. The emission driver of claim 5, wherein the stage of the plurality of stages further comprises a first capacitor including a first electrode connected to the first gate power voltage terminal and a second electrode connected to the seventh node.

7. The emission driver of claim 6, wherein the stage of the plurality of stages further comprises a second capacitor including a first electrode connected to the fifth node and a second electrode connected to the sixth node.

8. The emission driver of claim 7, wherein the stage of the plurality of stages further comprises a third capacitor including a first electrode connected to the second node and a second electrode connected to the third node.

9. The emission driver of claim 4, wherein the protection switching element is connected to the fourth node.

10. The emission driver of claim 4, wherein the protection switching element is connected to the eighth node.

11. The emission driver of claim 1, wherein the protection signal turns on the protection switching element in an initial driving period and turns off the protection switching element in a normal driving period after the initial driving period.

12. The emission driver of claim 11, wherein, in the initial driving period,
- the start signal has the first gate power voltage,
- the first clock signal has the second gate power voltage,
- the second clock signal has the second gate power voltage, and
- the protection signal has the second gate power voltage.

13. The emission driver of claim 1, wherein a capacitance of a line applying the first gate power voltage is greater than a capacitance of a line applying the protection signal.

14. A display apparatus comprising:
- a display panel which displays an image;
- a gate driver which provides a gate signal to the display panel;
- a data driver which provides a data voltage to the display panel; and
- an emission driver which provides an emission signal to the display panel,
- wherein the emission driver comprises a plurality of stages,
- wherein a stage of the plurality of stages receives a start signal, a first clock signal, a second clock signal, a protection signal, a first gate power voltage and a second gate power voltage and outputs the emission signal, and wherein the stage of the plurality of stages comprises:

a pull-up switching element connected between a first gate power voltage terminal which receives the first gate power voltage and an emission signal output terminal which outputs the emission signal;

a pull-down switching element connected between a second gate power voltage terminal which receives the second gate power voltage and the emission signal output terminal; and a protection switching element connected between the first gate power voltage terminal and a control electrode of the pull-down switching element.

* * * * *